(12) United States Patent
Yu

(10) Patent No.: US 11,477,597 B2
(45) Date of Patent: Oct. 18, 2022

(54) AUDIO PROCESSING METHOD AND ELECTRONIC APPARATUS

(71) Applicant: HTC Corporation, Taoyuan (TW)

(72) Inventor: Chin-Yun Yu, Taoyuan (TW)

(73) Assignee: HTC Corporation, Taoyuan (TW)

(*) Notice: Subject to any disclaimer, the term of this patent is extended or adjusted under 35 U.S.C. 154(b) by 5 days.

(21) Appl. No.: 17/164,788

(22) Filed: Feb. 1, 2021

(65) Prior Publication Data

US 2022/0248161 A1 Aug. 4, 2022

(51) Int. Cl.
*H04S 7/00* (2006.01)
*G06N 3/02* (2006.01)

(52) U.S. Cl.
CPC .............. *H04S 7/303* (2013.01); *G06N 3/02* (2013.01); *H04S 2420/01* (2013.01)

(58) Field of Classification Search
None
See application file for complete search history.

(56) References Cited

U.S. PATENT DOCUMENTS

2019/0045317 A1* 2/2019 Badhwar ................ H04S 7/302

OTHER PUBLICATIONS

Porschmann et al, "Directional Equalization of Sparse Head-Related Transfer Function Sets for Spatial Upsampling". pp. 1-12. (Year: 2019).*
Arend et al, "Directional Equalization of Sparse Head-Related Transfer Function Sets for Spatial Upsampling". pp. 1-8. (Year: 2019).*

* cited by examiner

*Primary Examiner* — Qin Zhu
(74) *Attorney, Agent, or Firm* — CKC & Partners Co., LLC

(57) ABSTRACT

An audio processing method is configured to upsample a first head related transfer function (HRTF) into a second HRTF. The first HRTF defines first audio feature values distributed at first intersection nodes in a spherical coordinate system over audio frequencies. The first intersection nodes are arranged with a first spatial resolution in the spherical coordinate system. The first HRTF is upsampled into the second HRTF by a spherical convolutional neural network model. The second HRTF defines a plurality of second audio feature values distributed at second intersection nodes in the spherical coordinate system over the audio frequencies. The second intersection nodes in the second HRTF are arranged with a second spatial resolution higher than the first spatial resolution of the first intersection nodes in the first HRTF.

20 Claims, 10 Drawing Sheets

AUDIO PROCESSING METHOD AND ELECTRONIC APPARATUS

BACKGROUND

Field of Invention

The disclosure relates to a method for processing an audio signal. More particularly, the disclosure relates to a method for processing a head related transfer function about an audio signal.

Description of Related Art

Many acoustic researchers have had many attempts to simulate virtual spatial sounds based on signal processing techniques. Listener's ears, head, and torso will interact with an acoustic sound, causing characteristic of the acoustic sound changes, delays or distorted relative to the listener. Variations caused by the listener to the acoustic sound can be described in a head related transfer function (HRTF).

SUMMARY

The disclosure provides an audio processing method, which includes following steps. A first head related transfer function (HRTF) is received and the first head related transfer function defines first audio feature values distributed at first intersection nodes in a spherical coordinate system over audio frequencies. The first intersection nodes are arranged with a first spatial resolution in the spherical coordinate system. The first HRTF is upsampled into a second head related transfer function (HRTF) by a spherical convolutional neural network model. The second HRTF defines a plurality of second audio feature values distributed at second intersection nodes in the spherical coordinate system over the audio frequencies. The second intersection nodes in the second HRTF are arranged with a second spatial resolution higher than the first spatial resolution of the first intersection nodes in the first HRTF. Each one of second audio feature values on one audio frequency in the second HRTF is calculated according to a convolution result based on the first audio feature values not only with the same frequency, but at least one or more different audio frequencies in the first HRTF.

The disclosure also provides an electronic apparatus. The electronic apparatus includes a data storage and a processor. The data storage is configured to store a spherical convolutional neural network model. The processor is coupled with the data storage. The processor is configured to receive a first head related transfer function (HRTF). The first HRTF defines a plurality of first audio feature values distributed at first intersection nodes in a spherical coordinate system over a plurality of audio frequencies. The first intersection nodes are arranged with a first spatial resolution in the spherical coordinate system. The processor is further configured to upsample the first HRTF into a second head related transfer function (HRTF) by the spherical convolutional neural network model. The second HRTF defines a plurality of second audio feature values distributed at second intersection nodes in the spherical coordinate system over the audio frequencies. The second intersection nodes in the second HRTF are arranged with a second spatial resolution higher than the first spatial resolution of the first intersection nodes in the first HRTF. Each one of second audio feature values on one audio frequency in the second HRTF is calculated according to a convolution result based on the first audio feature values not only with the same frequency, but at least one or more different audio frequencies in the first HRTF.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
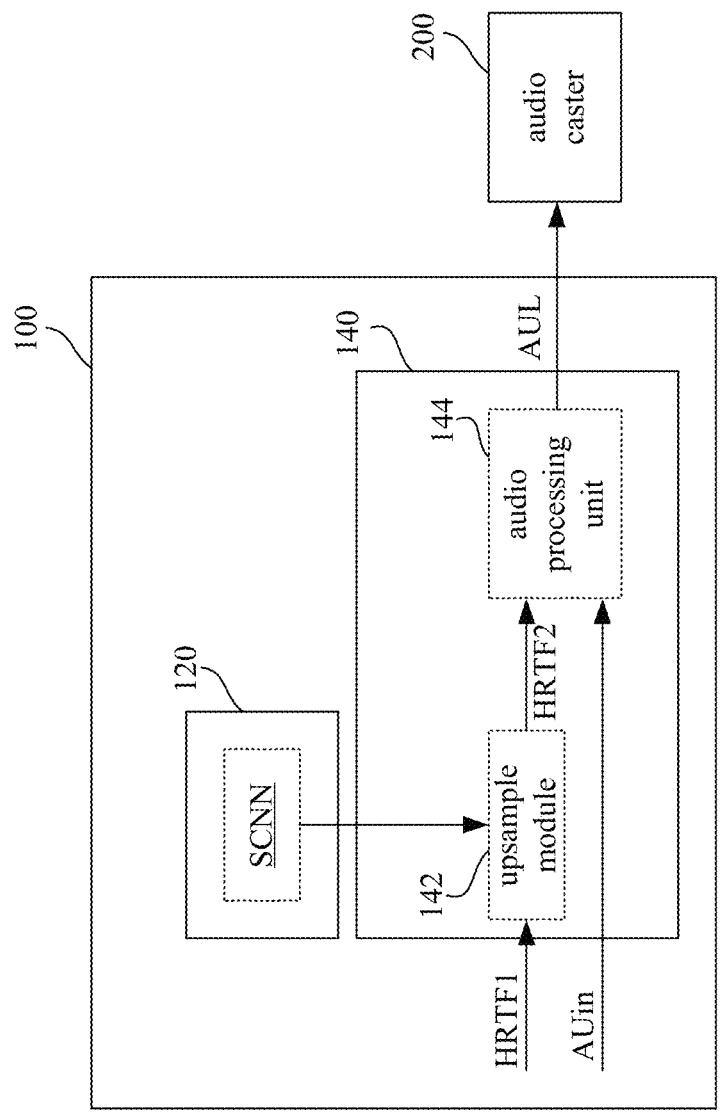
FIG. 1 is a schematic diagram illustrating an electronic apparatus according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram illustrating an electronic apparatus 100 according to an embodiment of the disclosure. The electronic apparatus 100 is suitable for processing a head related transfer function (HRTF) for localizing an audio signal.

As shown in FIG. 1, the electronic apparatus 100 includes a data storage 120 and a processor 140. The processor 140 is coupled with the data storage 120. In an embodiment, the data storage can be implemented by a memory, a hard-disk, a cache, a non-transitory computer readable medium, a register, a data storage array or any equivalent data storage components. In an embodiment, the processor can be implemented by a central processing unit, a processing circuit, a graphic processing unit (GPU), an application-specific integrated circuit (ASIC) or any equivalent processing component.

In some embodiments, the electronic apparatus 100 is able to receive a first head related transfer function HRTF1 from an external source (not shown in figures). The first head related transfer function HRTF1 is a function which describes the sound transmission characteristics from a certain sound source in spatial to the ears of a listener. Variations in anatomy between humans may cause the first head related transfer function HRTF1 to be different for each listener, different between each ear, and different for sound sources located at various locations in space relative to the listener. The first head related transfer function HRTF1 can provide information about how to localize an audio signal AUin. In some embodiments, the audio signal AUin can be a mono acoustic signal. In some other embodiments, the audio signal AUin can be a stereo acoustic signal.

In general, a HRTF with a high resolution in spatial system can provide a precise localization of the acoustic sound relative to the listener. However, the HRTF with the high resolution occupies a large data volume, and it will require a large network bandwidth to transmit the HRTF with the high resolution over communication networks in real time.

As shown in FIG. 1, the data storage 120 stores the parameters of a spherical convolutional neural network model SCNN. The processor 140 is coupled with the data storage 120. The processor 140 includes an upsample module 142. The upsample module 142 is configured to upsample a first head related transfer function HRTF1 into a second head related transfer function HRTF2 according to the spherical convolutional neural network model SCNN. Upsample in here means extending the number of spatial points of HRTF, differ from extending the sampling rate of audio time signal. Further details about how to upsample according to the spherical convolutional neural network model SCNN will be discussed in following paragraphs. In some embodiments, the upsample module 142 can be implemented by programmable instruction codes executed by the processor 140 or by an application specific integrated circuit (ASIC).

Figures 2A, 2B:
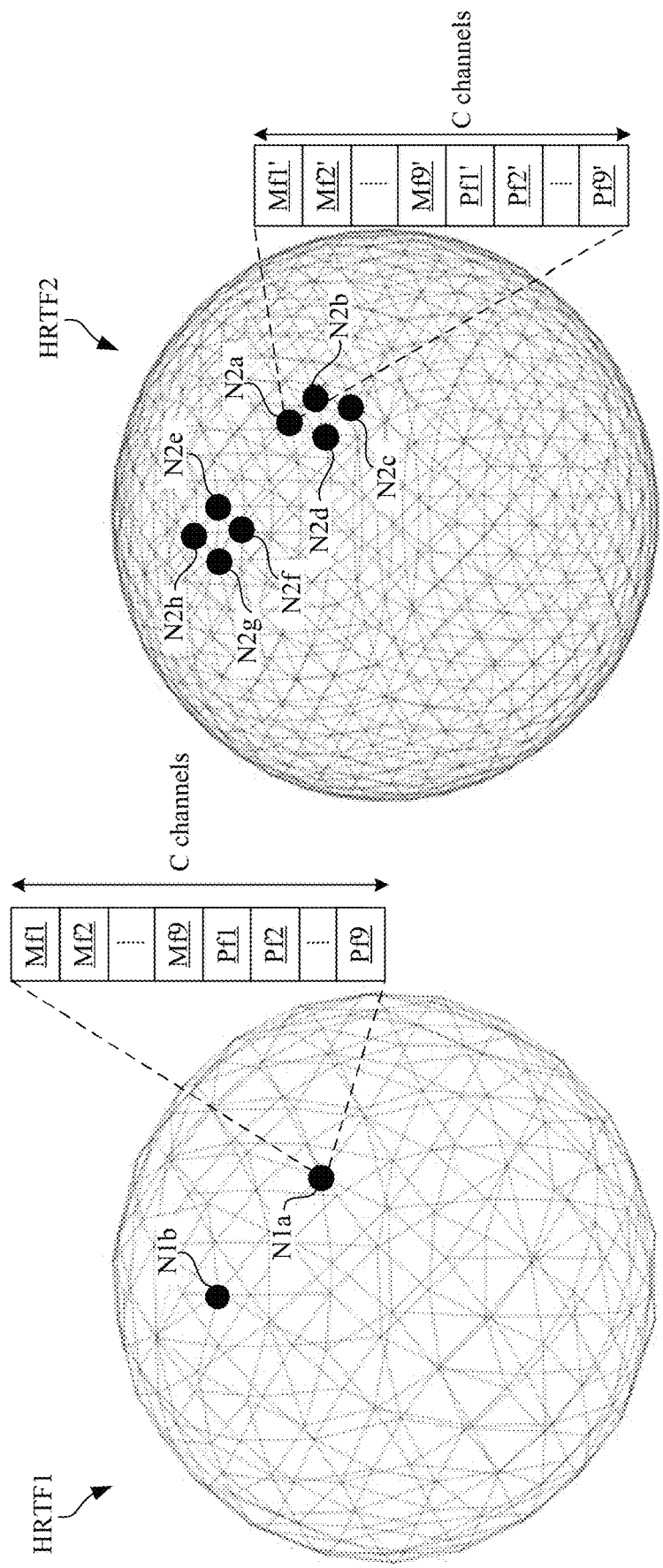
FIG. 2A is a schematic diagram illustrating the first head related transfer function HRTF1 in some embodiments of the disclosure.
FIG. 2B is a schematic diagram illustrating the second head related transfer function HRTF2 in some embodiments of the disclosure.

Reference is further made to FIG. 2A and FIG. 2B. FIG. 2A is a schematic diagram illustrating the first head related transfer function HRTF1 in some embodiments of the disclosure. FIG. 2B is a schematic diagram illustrating the second head related transfer function HRTF2 in some embodiments of the disclosure.

As shown in FIG. 2A, the first head related transfer function HRTF1 defines audio feature values distributed at first intersection nodes (e.g., N1a, N1b) in a spherical coordinate system. It is noticed that there are lots of first intersection nodes located on every intersectional points between edges in the spherical coordinate system. For example, the first head related transfer function HRTF1 may include total 256 first intersection nodes. For brevity, two first intersection nodes N1a and N1b are labelled for demonstration. The first intersection node N1a is configured to mark a specific spatial location relative to a listener located at the center of the sphere. If the audio source is located at the same direction respected to the listener of the position at the first intersection node N1a, the audio feature values Mf1~Mf5 and Pf1~Pf5 will be applied to process the audio signal AUin to simulate the location of the audio source. In some embodiments, there are two individual head related transfer functions (HRTFs) respectively for the right ear and the left ear. If the audio signal AUin is a mono acoustic signal, and the mono acoustic signal can be processed based on two individual head related transfer functions (HRTFs) to provide stereo sound effects. If the audio signal AUin is a stereo acoustic signal, and two channels of the stereo acoustic signal can be processed separately based on two individual head related transfer functions (HRTFs) to provide stereo sound effects. The first head related transfer function HRTF1 shown in FIG. 2A demonstrates one of these head related transfer functions for one ear, and there will be another first head related transfer function (not shown in figures) for the other ear.

As shown in FIG. 2A, in some embodiments, the audio feature values Mf1~Mf9 and Pf1~Pf9 on the first intersection node N1a may include magnitude values Mf1~Mf9 over different audio frequencies f1~f9 and phase values Pf1~Pf9 over the audio frequencies f1~f9. For example, the audio frequencies f1~f9 can be 2000 Hz; 3000 Hz, 4000 Hz, 5000 Hz, 6000 Hz, 7000 Hz, 8000 Hz, 9000 Hz and 10000 Hz. The magnitude value Mf1 indicates a strength adjustment level from the first intersection node N1a to the listener at the audio frequency 2000 Hz. The magnitude value Mf2 indicates a strength adjustment level from the first intersection node N1a to the listener at the audio frequency 3000 Hz. In similar way, the magnitude value Mf9 indicates a strength adjustment level from the first intersection node N1a to the listener at the audio frequency 10000 Hz. The phase value Pf1 indicates a phase adjustment value from the first intersection node N1a to the listener at the audio frequency 2000 Hz. The phase value Pf2 indicates a phase adjustment value from the first intersection node N1a to the listener at the audio frequency 3000 Hz. In similar way, the phase value Pf9 indicates a phase adjustment value from the first intersection node N1a to the listener at the audio frequency 10000 Hz.

It is noticed that, there are total nine magnitude values Mf1-Mf9 and nine phase values Pf1~Pf9 over nine different audio frequencies. In other words, there are eighteen magnitude/phase values Mf1-Mf9 and Pf1-Pf9 on eighteen different channels on the first intersection node N1a (in this case, the channel count C=18). The disclosure is not limited to 18 channels. In some other embodiments, if there are magnitude/phase values on more or less audio frequencies, the channel count can vary accordingly. In other words, the first head related transfer function HRTF1 defines N first intersection nodes in the spherical coordinate system. The first head related transfer function HRTF1 corresponding to the N first intersection nodes includes N*C audio magnitude/phase values (e.g., Mf1~Mf9 and Pf1~Pf9) on the C different channels. N and C are positive integers larger than 1. The above case only consider HRTF from one of the left and right ear, if both ear is considered, the channels size will be doubled (C=36).

As mentioned above, the first head related transfer function HRTF1 in FIG. 2A may include total 256 first intersection nodes. In other words, the first head related transfer function HRTF1 can simulate a sound source from 256 directions to the listener. In some advanced applications, it is desired to provide a high quality of the audio signal AUin by localizing the audio signal AUin with a higher preciseness. The upsample module 142 is configured to generate the second head related transfer function HRTF2 as shown in FIG. 2B by upsampling the first head related transfer function HRTF1 as shown in FIG. 2A.

As shown in FIG. 2B, the second head related transfer function HRTF2 defines second audio feature values distributed at second intersection nodes (e.g., N2a~N2h) in the spherical coordinate system. It is noticed that there are lots of second intersection nodes located on every intersectional points between edges in the spherical coordinate system. For example, the second head related transfer function HRTF2 may include total 1024 second intersection nodes. For brevity, eight second intersection nodes N2a~N2h are labelled for demonstration.

The second intersection nodes in the second head related transfer function HRTF2 are arranged with a higher spatial resolution compared to the spatial resolution of the first intersection nodes in the first head related transfer function HRTF1. In the embodiments shown in FIG. 2A and FIG. 2B, the spatial resolution of the second head related transfer function HRTF2 is 4 times as the spatial resolution of the first head related transfer function HRTF1. Therefore, the second head related transfer function HRTF2 can be utilized to provide a more precise localization while processing an audio signal AUin.

As shown in FIG. 1, after the upsample module 142 generates the second head related transfer function HRTF2, an audio processing unit 144 in the processor 140 can apply the second head related transfer function HRTF2 onto the audio signal AUin to localize the audio signal AUin to a particular point in space, so as to generate a stereo audio signal AUL. Afterward, the audio processing unit 144 can transmit the stereo audio signal AUL after localization to an audio caster 200. In some embodiments, the audio caster 200 can be speakers, ear pods, loudspeakers, or any equivalent audio caster. In some embodiments, the audio processing unit 144 can be implemented by programmable instruction codes executed by the processor 140 or by an application specific integrated circuit (ASIC).

In some embodiments, the first head related transfer function HRTF1 transmitted from the external source to the electronic apparatus 100 has a relatively low spatial resolution. Therefore, the first head related transfer function HRTF1 can be transmitted over a relatively small bandwidth. The electronic apparatus 100 is able to increase the resolution of the head related transfer function by upsampling the first head related transfer function HRTF1 into a second head related transfer function HRTF2 with a relatively high spatial resolution. The second head related transfer function HRTF2 can be facilitated in localization of the audio signal with a higher preciseness.

In this case, the electronic apparatus 100 can receive the first head related transfer function HRTF1 (low resolution) with the small transmission bandwidth and utilize the second head related transfer function HRTF2 (high spatial resolution) to localize the audio signal precisely.

In some other embodiments, when the electronic apparatus 100 is not playing the audio signal, the first head related transfer function HRTF1 can be stored in the data storage 120 in the electronic apparatus 100. The first head related transfer function HRTF1 with the low spatial resolution will occupy a smaller storage volume in the data storage 120 (compared to the second head related transfer function HRTF2). When the electronic apparatus 100 needs to play the audio signal, the processor 140 can upsample the first head related transfer function HRTF1 into the second head related transfer function HRTF2, and utilizes the second head related transfer function HRTF2 to localize the audio signal precisely.

Figure 3:
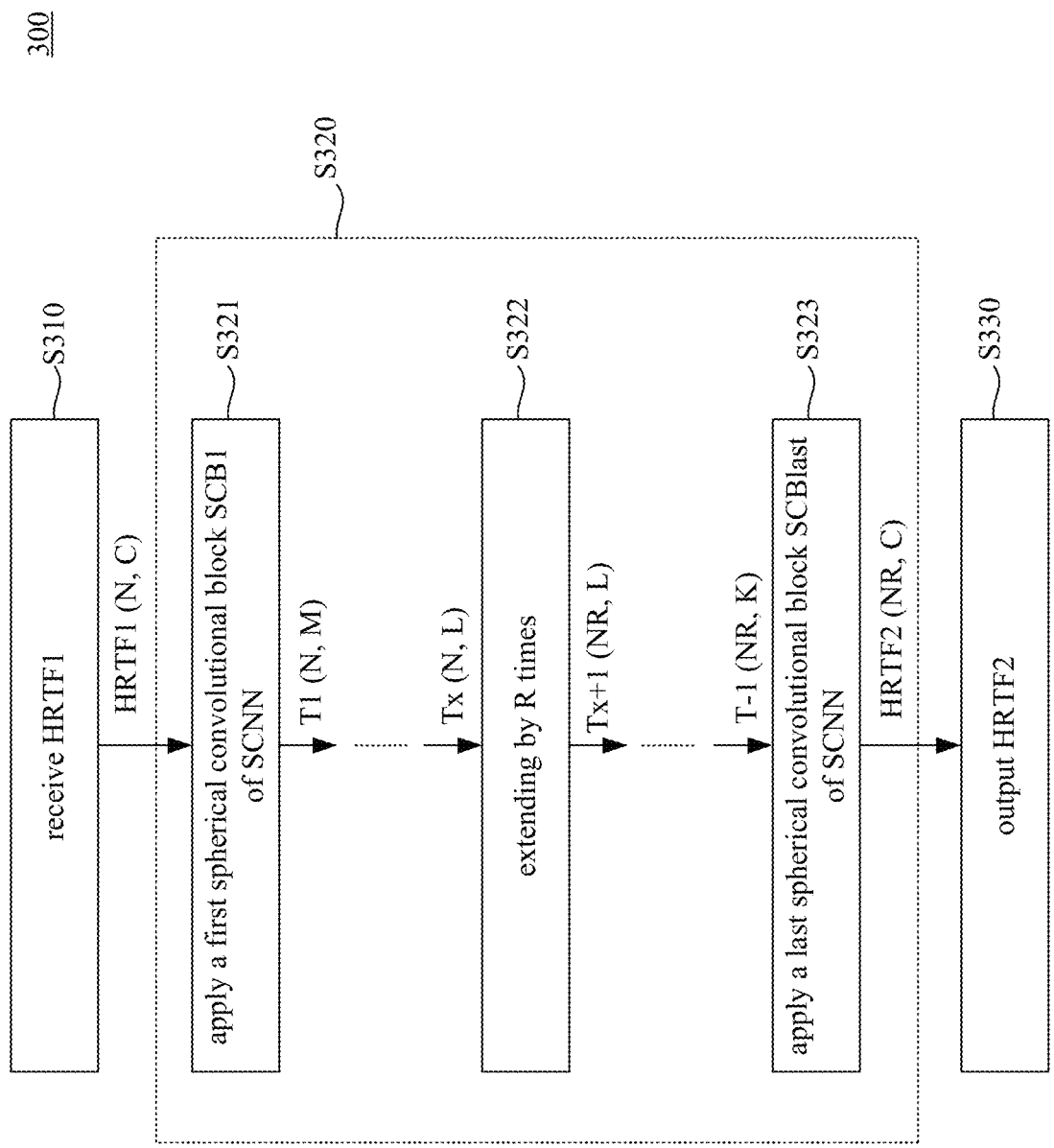
FIG. 3 is a flow chart diagram illustrating an audio processing method according to some embodiments of the disclosure.

Reference is further made to FIG. 3, which is a flow chart diagram illustrating an audio processing method 300 according to some embodiments of the disclosure. In some embodiments, the audio processing method 300 in FIG. 3 is executed by the electronic apparatus 100 in FIG. 1.

As shown in FIG. 1 and FIG. 3, in step S310, the electronic apparatus 100 receives the first head related transfer function HRTF1 in FIG. 2A. Step S320 is executed, by the upsample module 142, to upsample the first head related transfer function HRTF1 in FIG. 2A into the second head related transfer function HRTF2 in FIG. 2B.

In some embodiments, the step S320 includes further steps S321-S323 as shown in FIG. 3. In step S321, the upsample module 142 applies a first spherical convolutional block SCB1 of the spherical convolutional neural network model SCNN to the first head related transfer function HRTF1 to calculate a hidden tensor T1, which includes N*M hidden feature values on M different channels. In other words, the hidden tensor T1 includes N intersection nodes and M channels.

Figure 4A:
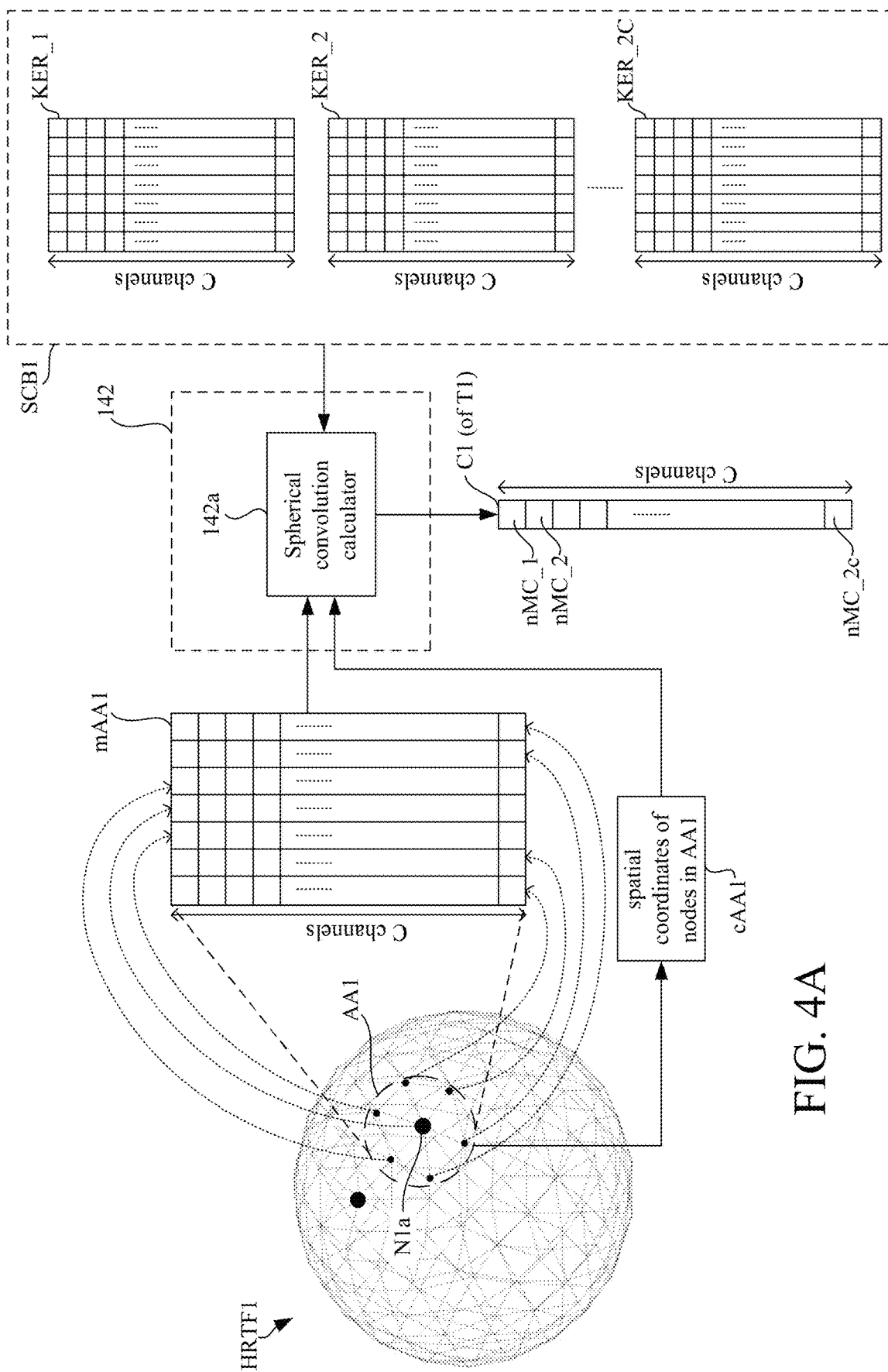
FIG. 4A is a schematic diagram illustrating a convolution process between the first spherical convolutional layer and the first head related transfer function according to some embodiments.
Figure 4C:
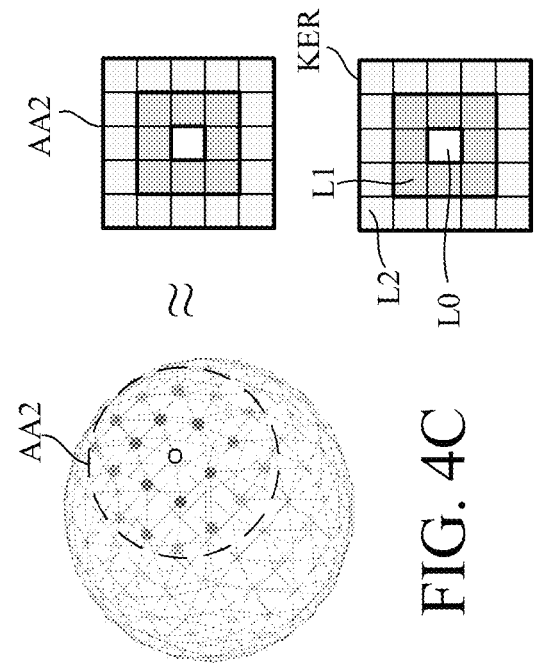
FIG. 4B and FIG. 4C are schematic diagrams illustrating different sizes of sampling area and corresponding convolutional kernel in the first spherical convolutional layer according to some embodiments.
Figure 4B:
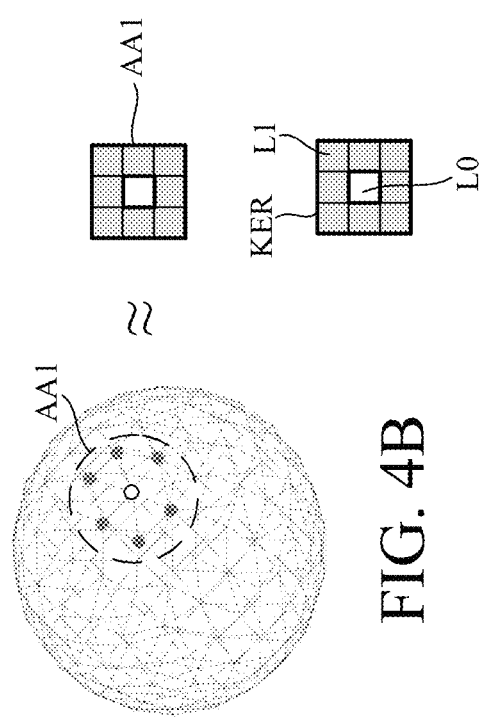
Figure 5A:
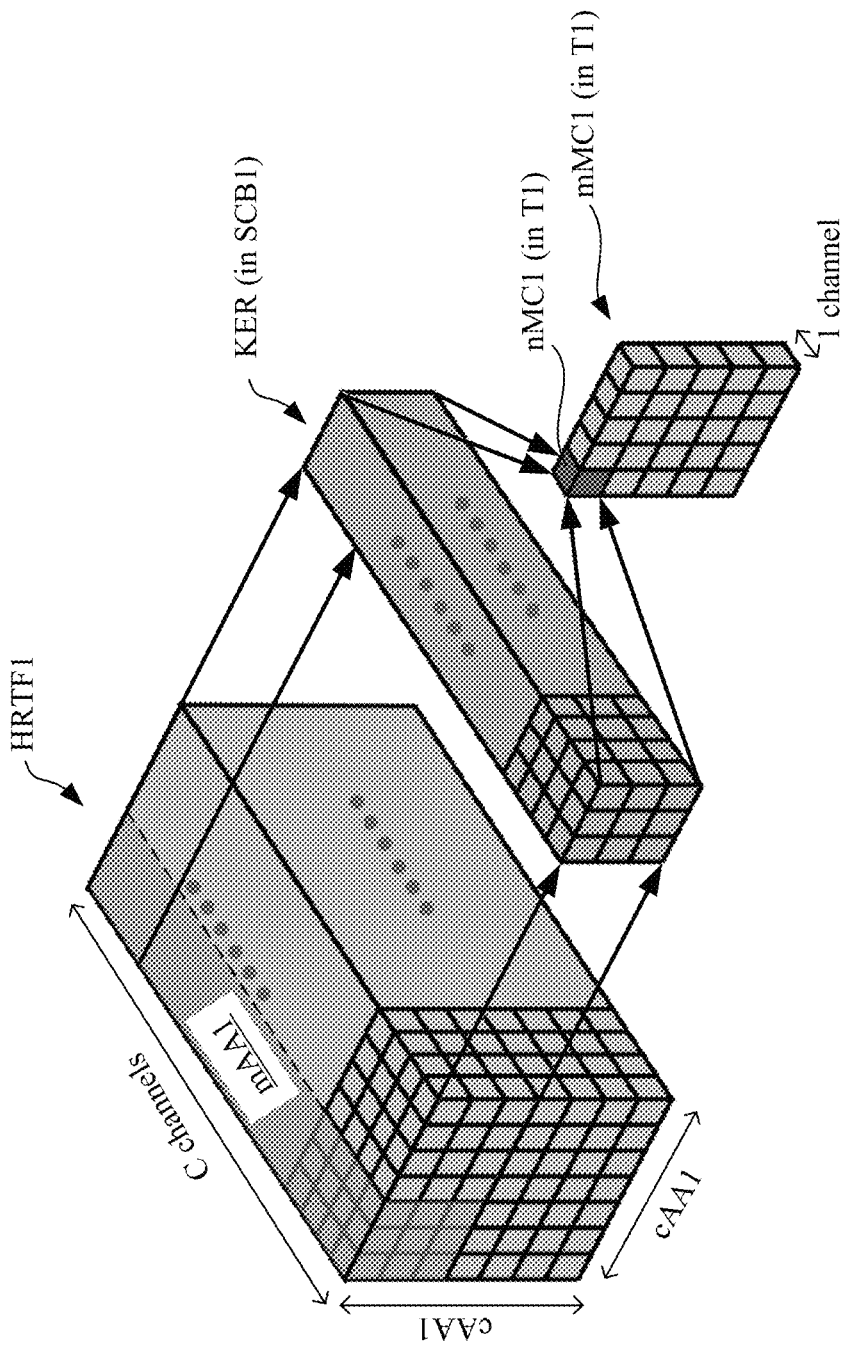
FIG. 5A is a schematic diagram illustrating a convolution process between the first spherical convolutional layer and the first head related transfer function according to some embodiments.

Reference is further made to FIG. 4A, FIG. 4B, FIG. 4C and FIG. 5A. FIG. 4A is a schematic diagram illustrating a convolution process between the first spherical convolutional block SCB1 and the first head related transfer function HRTF1 in S321 according to some embodiments. FIG. 4B and FIG. 4C are schematic diagrams illustrating different sizes of sampling area AA1 and AA2 and corresponding convolutional kernel KER in the first spherical convolutional block SCB1 according to some embodiments. FIG. 5A is a schematic diagram illustrating a convolution process between the first spherical convolutional block SCB1 and the first head related transfer function HRTF1 in S321 according to some embodiments.

As shown in FIG. 4A, there are many intersection nodes on the first head related transfer function HRTF1. Individual convolution calculations will be executed respectively on each of the intersection nodes in the first head related transfer function HRTF1. For brevity, the intersection node N1a is discussed for demonstration. Corresponding to the intersection node N1a, a sampling area AA1 is selected around the intersection node N1a on the spherical coordinate system. Each of the first head related transfer function HRTF1 and the second HRTF can be represented as 2-dimensional matrix, with one dimension represent nodes and another represent audio features (e.g., the magnitude values or phase values on different frequency channels). A submatrix with nodes included in the sampling area AA1 is selected along the nodes dimension as shown in FIG. 4A. In some embodiments, the first spherical convolutional block SCB1 includes a spherical convolutional layer for executing the spherical convolutional calculation, and the spherical convolutional layer includes the convolutional kernels KER_1, KER_2 . . . KER_2C as shown in FIG. 4A. The spherical convolution neural network layer can be implemented by, but not limited to, a Graph Neural Network (GNN) based spherical convolution network or other kinds of neural network that apply spherical convolution. Individual convolution calculations are performed between the matrix mAA1 with each one of all convolutional kernels KER_1, KER_2 . . . KER_2C in the spherical convolutional layer of the first spherical convolutional block SCB1. The spherical convolution calculator 142a in the upsample module 142 will perform spherical calculation base on the input matrix (e.g., the matrix mAA1), the sharable convolutional kernels (e.g., the convolutional kernels KER_1, KER_2 . . . KER_2C in the first spherical convolutional block SCB1), spatial coordinates cAA1 of the selected nodes in the sampling area AA1, and a selected spherical convolution algorithms. For example, a convolution is performed between the matrix mAA1 and the convolutional kernel KER_1 to calculates one feature value nMC_1 on the first channel; another convolution is performed between the matrix mAA1 and the convolutional kernel KER_2 to calculates one feature value nMC_2 on the second channel; and another convolution is performed between the matrix mAA1 and the convolutional kernel KER_2C to calculates one feature value nMC_2c on the $2C^{th}$ channel. As shown in FIG. 4A, these feature values nMC_1, nMC_2 . . . nMC_2c together form one column C1 of the hidden tensor T1. When the sampling area AA1 is selected corresponding to another intersection node (other than the intersection node N1a) on the spherical coordinate system, aforesaid convolution calculations can be repeated again to calculate another column (referring to the column C1) of the hidden tensor T1.

As shown in FIG. 5A, when a convolution calculation is performed between the matrix mAA1 and one convolutional kernel KER in the first spherical convolutional block SCB1, one feature value nMC1 in the first hidden tensor T1 in one channel will be generated. It is noticed that, in FIG. 5A, the matrix mAA1 are represented as a 3-dimensional tensor. Two dimensions of 3-dimensional tensor mAA1 correspond to the spatial coordinates cAA1, and the other one dimension of 3-dimensional tensor mAA1 corresponds to different channels. When the sampling area AA1 moves to different coordinates on the spherical coordinate system, other feature values in the first hidden tensor T1 on one channel will be generated, such that the feature value matrix mMC1 on one channel is generated as shown in FIG. 5A. As shown in FIG. 4A and FIG. 5A, there are 2C (based on aforesaid embodiment, 2C are equal to 36) convolutional kernels KER_1, KER_2 . . . KER_2C in the first spherical convolutional block SCB1, total 36 different feature value matrixes (similar to mMC1 in FIG. 5A) on 36 channels will be generated as the first hidden tensor T1. In other words, the first hidden tensor T1 includes feature values on N intersection nodes and 2C channels.

It is noticed that the T1 includes 2C channels are demonstrated as an example. However, the disclosure is not limited thereto. In other embodiments, if the first spherical convolutional block SCB1 includes different amounts of the convolutional kernels, the hidden tensor T1 will have the corresponding amount of channels. For example, when the first spherical convolutional block SCB1 includes M different convolutional kernels, and the amount of channels in the hidden tensor T1 will be M, which M can be a positive integer larger than 2.

In other words, the first hidden tensor T1 includes feature values on N intersection nodes and M channels, as shown in FIG. 3. In the embodiments shown in FIG. 4A, M equals to 2C, but the disclosure is not limited thereto.

As shown in FIG. 4B, the sampling area AA1 can be configured to include the intersection node N1a and adjacent nodes in one distance unit around intersection node N1a. The intersection node N1a and adjacent nodes in one distance unit around intersection node N1a on the spherical coordinate system are similar to 3*3 matrix. The sampling area AA1 on the spherical coordinate system is illustrated as 3*3 matrix for ease of understanding. It is notice that, the sampling area AA1 in the disclosure is a spherical surface on the spherical coordinate system. FIG. 4B also shows one channel of the convolutional kernels KER of the spherical convolutional block SCB1 corresponding to the sampling area AA1 has two learnable parameters L0 and L1. One learnable parameter L0 is arranged at the center on the 3*3 matrix. Another learnable parameter L1 is arranged at the outer ring on the 3*3 matrix.

The disclosure is not limited to the size of the sampling area AA1 as shown in FIG. 4B. FIG. 4C shows another size of the sampling area AA2. As shown in FIG. 4C, the sampling area AA2 can be configured to include the intersection node N1a and adjacent nodes in two distance units around intersection node N1a. The sampling area AA2 on the spherical coordinate system can illustrated as 5*5 matrix for ease of understanding. It is notice that, the sampling area AA2 in the disclosure is a spherical surface on the spherical coordinate system. FIG. 4C also shows one channel of the convolutional kernels KER of the spherical convolutional block SCB1 corresponding to the sampling area AA2 has three learnable parameters. One learnable parameter L0 is arranged at the center on the 5*5 matrix. Another learnable parameter L1 is arranged at the middle ring on the 5*5 matrix. Another learnable parameter L2 is arranged at the outer ring on the 5*5 matrix.

In some embodiments, the spherical convolutional block SCB1 in the spherical convolutional neural network model SCNN may further include additional layers besides the spherical convolutional layer (including the convolutional kernels KER_1, KER_2 . . . KER_2C). These additional layers may include a normalization layer, a non-linear activation layer (e.g., ReLU layer) and/or a padding layer, not shown in figures. The normalization layer and the activation layer in the spherical convolutional block SCB1 can be applied after the spherical convolutional layer (including the convolutional kernels KER_1, KER_2 . . . KER_2C).

In step S322, an interpolation algorithm is applied to a hidden tensor Tx with size of N*L (N intersection nodes and L channels) to extend number of the elements in the hidden tensor Tx by R times bigger, and an extended result is a hidden tensor Tx+1 includes NR*L hidden values. In other words, the hidden tensor Tx+1 includes NR intersection nodes and L channels. R is bigger than 1 and is under the condition that NR is an integer.

In some embodiments, as shown in FIG. 3, if the step S322 is applied immediately after step S321, then L equals to 2C and the hidden tensor Tx equals to the hidden tensor T1 (generated in step S321).

In some other embodiments, the spherical convolutional neural network model SCNN may include one or more spherical convolutional block (similar to the first spherical convolutional block SCB1 in step S321) between steps S321 and S322, and it can process the hidden tensor T1 into the hidden tensor Tx. For example, the spherical convolutional neural network model SCNN can include another spherical convolutional block after the first spherical convolutional block SCB1 in step S321, and the another spherical convolutional block is applied to convert the hidden tensor T1 into the hidden tensor Tx, and in this case, L can be different from 2C, and L is determined by the amount of convolutional kernels in the another spherical convolutional block.

In some other embodiments, the extending operation in step S322 can be applied immediately after receiving the first head related transfer function HRTF1 (without applying the first spherical convolutional block SCB1 in step S321), and in this case L equals to C.

Figure 5B:
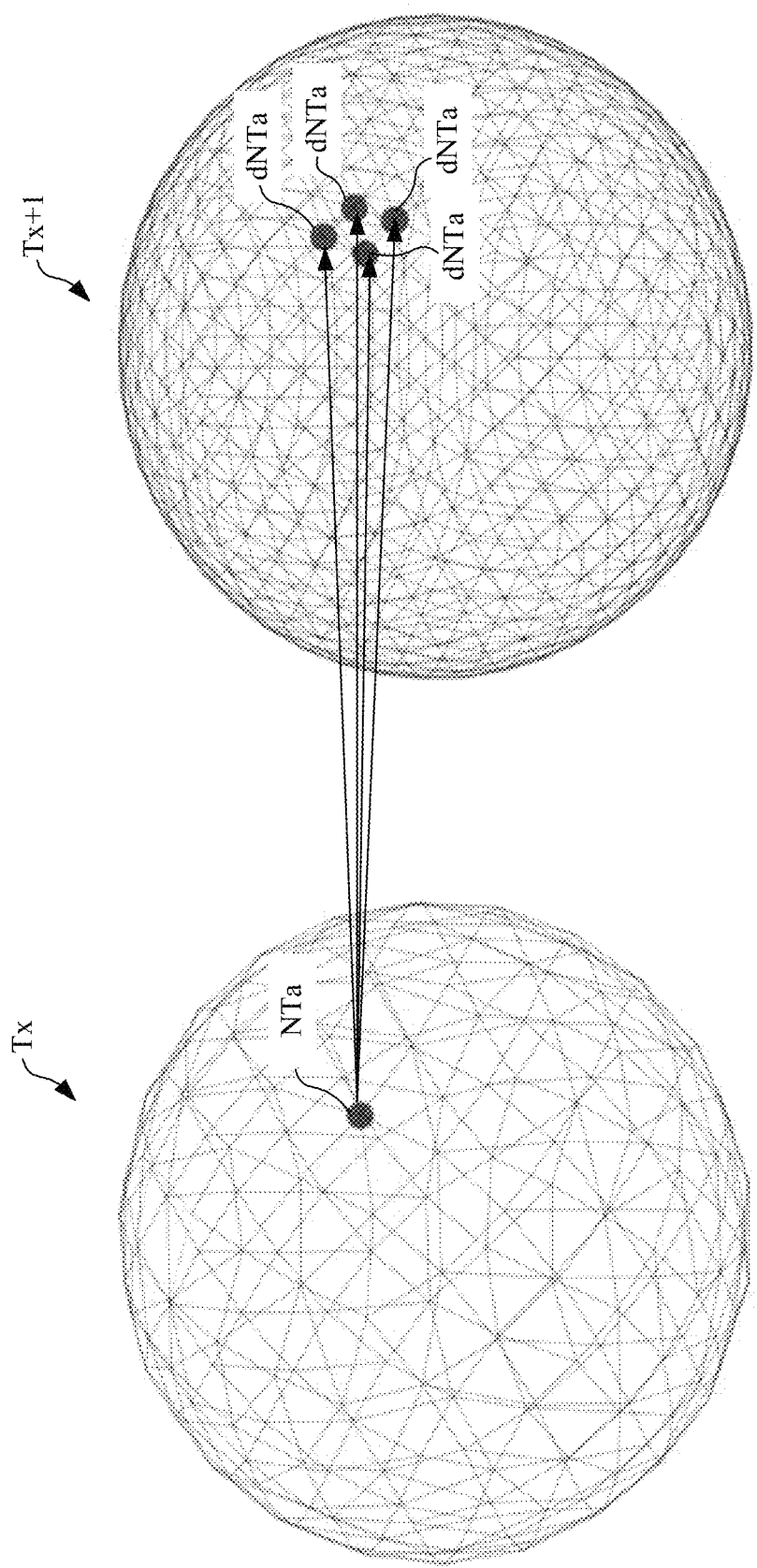
FIG. 5B is a schematic diagram illustrating the second hidden tensor and the third hidden tensor according to some embodiments.

Reference is further made to FIG. 5B, which is a schematic diagram illustrating the hidden tensor Tx and the hidden tensor Tx+1 according to some embodiments when the interpolation algorithm is nearest-neighbor. In step S322, the upsample module 142 duplicate audio magnitude/phase values on L channels corresponding to a target first intersection node NTa by R times and mapping R duplicated audio magnitude/phase values onto a portion of the second intersection nodes dNTa in the spherical coordinate system. The portion of the second intersection nodes dNTa is adjacent to the target first intersection node NTa in the spherical coordinate system. In the embodiment shown in FIG. 5C, R is equal to 4; in other words, the audio magnitude/phase values on L channels corresponding to a target first intersection node NTa in the hidden tensor Tx are duplicated and mapped to four different second intersection nodes dNTa in the spherical coordinate system in the hidden tensor Tx+1. In this case, the spatial resolution of the intersection nodes in the hidden tensor Tx+1 is increased as 4 times as the spatial resolution of the intersection nodes in the hidden tensor Tx.

The upsample module 142 is not limited to duplicate audio magnitude/phase values. In some embodiments, the upsample module 142 is able to interpolate the audio magnitude/phase values on the N*R second intersection nodes in the hidden tensor Tx+1 independently for each channel, based on spatial positions of the N first intersections nodes in the hidden tensor Tx and the N*R second intersection nodes in the hidden tensor Tx+1. The interpolation method can be, but not limit to, a nearest-neighbor interpolation or a linear interpolation.

Figure 5C:
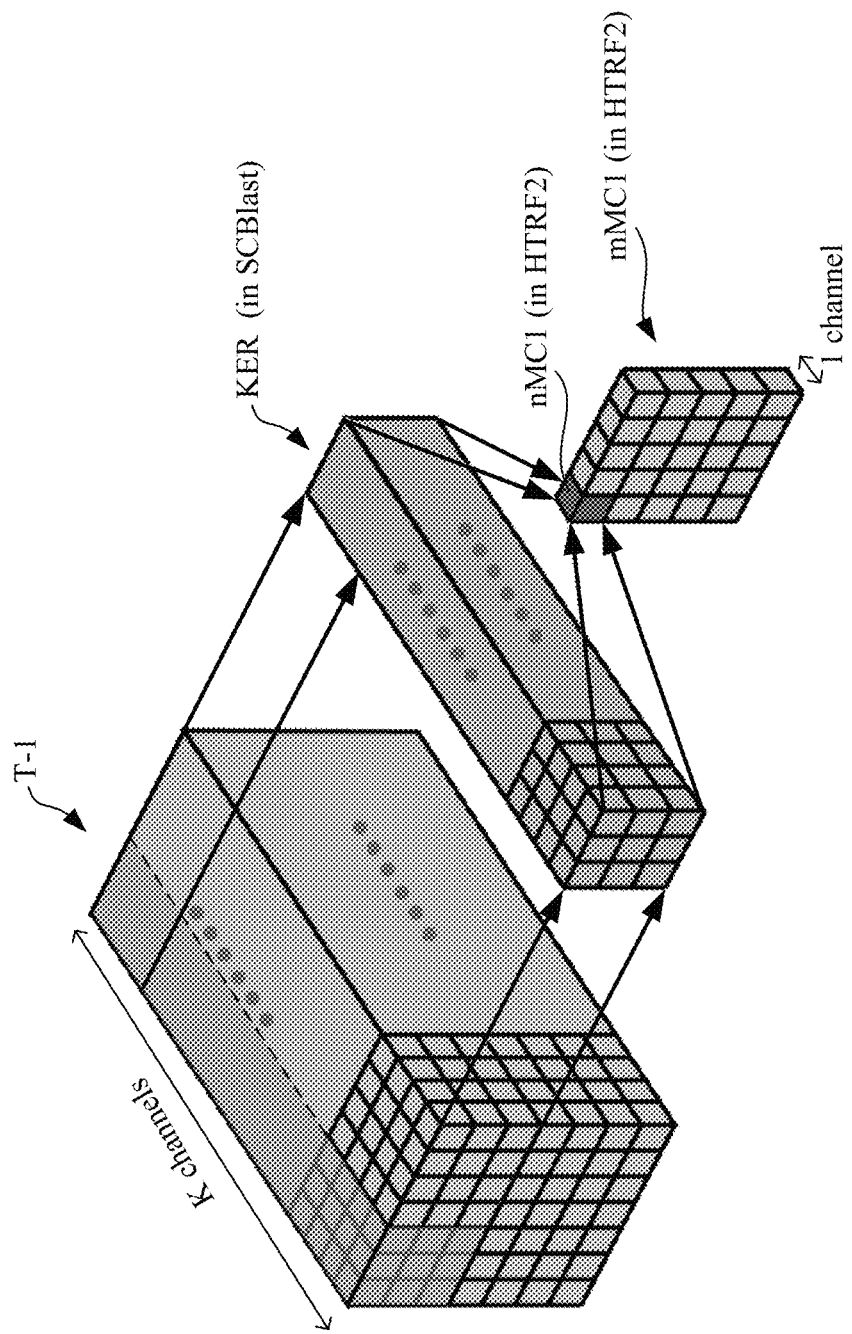
FIG. 5C is a schematic diagram illustrating a convolution process between a third spherical convolutional layer and the third hidden tensor according to some embodiments.

Reference is further made to FIG. 5C, which is a schematic diagram illustrating a convolution process between the last spherical convolutional block SCBlast and the last hidden tensor T−1 in step S323 according to some embodiments. The last hidden tensor T−1 as shown in FIG. 5C include N intersection nodes and K channels In step S323, the upsample module 142 applies the last spherical convolutional block SCBlast of the spherical convolutional neural network model SCNN to the last hidden tensor T−1 to calculate a second head related transfer function HRTF2, which includes NR*C audio magnitude/phase values on C different channels. In other words, the second head related transfer function HRTF2 includes NR intersection nodes and C channels. It is noticed that each of the last hidden tensor T−1 and the second head related transfer function HRTF2 includes a larger amount of the intersection nodes as 4 times as the amount of the intersection nodes in the hidden tensor T1 or Tx. For brevity, FIG. 5C does not show all of the intersection nodes in the last hidden tensor T−1.

Details about step S323 shown in FIG. 5C is similar to step S321 as explained in FIG. 4A to FIG. 4C and FIG. 5A. FIG. 5C illustrate one convolutional kernel KER in the spherical convolutional block SCBlast for demonstration. In some embodiments, the spherical convolutional block SCBlast includes C different convolutional kernels for generating the second head related transfer function HRTF2 with C different channels.

In some embodiments, more spherical convolutional blocks can be added between S321 and S322, or between S322 and S323 or both.

In some embodiments, the last spherical convolutional block SCBlast includes a spherical convolutional layer for executing the spherical convolutional calculation, and the spherical convolutional layer in the last spherical convolutional block SCBlast includes convolutional kernels (can be referred to KER_1, KER_2 . . . KER_2C as shown in FIG. 4A). The spherical convolution neural network layer can be implemented by, but not limited to, a Graph Neural Network (GNN) based spherical convolution network or other kinds of neural network that apply spherical convolution.

In some embodiments, the last spherical convolutional block SCBlast in the spherical convolutional neural network model SCNN may further include additional layers besides the spherical convolutional layer. These additional layers may include a normalization layer and/or a non-linear activation layer (e.g., ReLU layer), not shown in figures. The normalization layer and the activation layer in the last spherical convolutional block SCBlast can be applied after the spherical convolutional layer.

Figure 6:
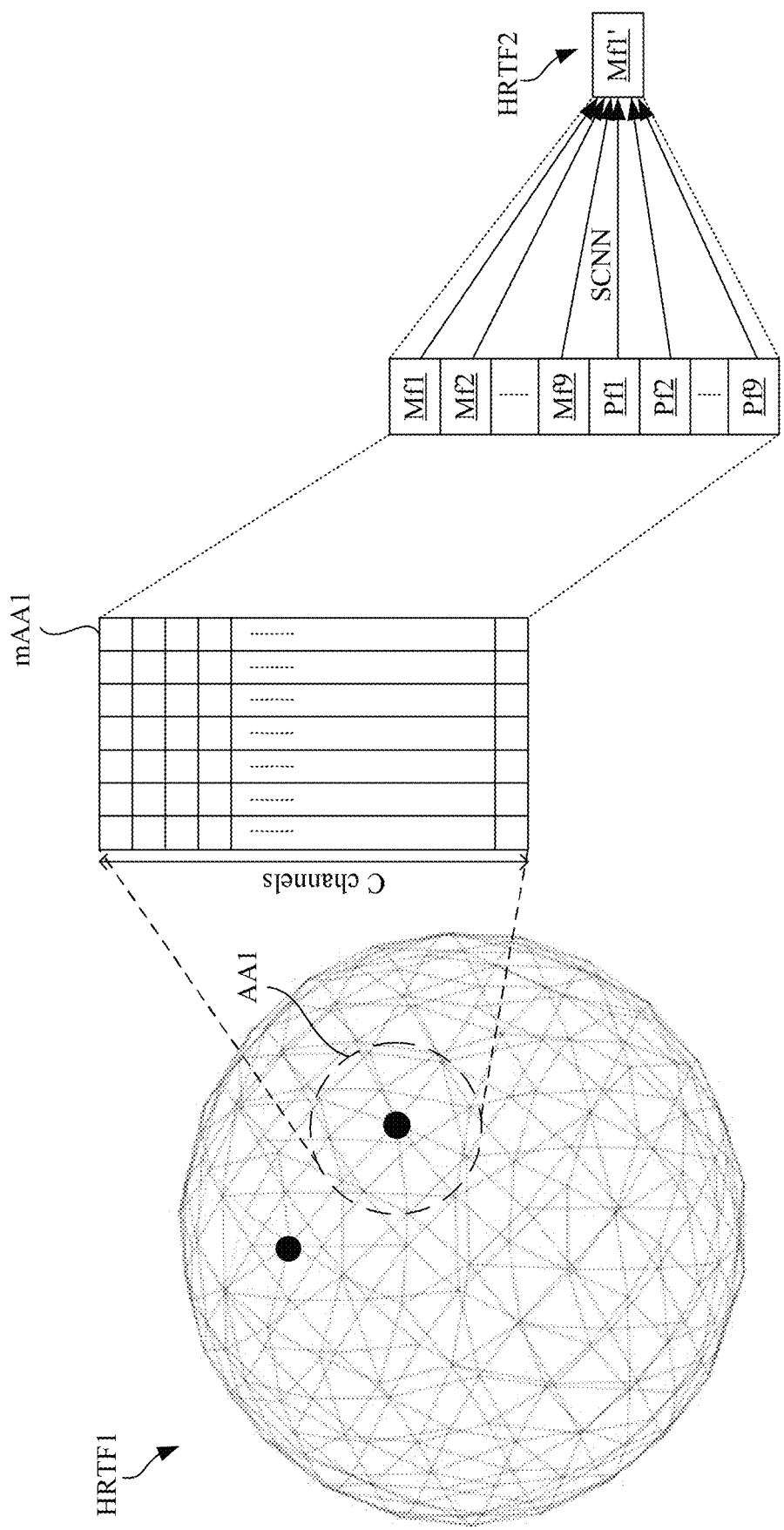
FIG. 6 is a schematic diagram illustrating the convolution according to the spherical convolutional neural network model from the first head related transfer function into one audio magnitude value in the second head related transfer function according to some embodiments.

Reference is further made to FIG. 6, which is a schematic diagram illustrating the convolution according to the spherical convolutional neural network model SCNN from the first head related transfer function HRTF1 into one audio magnitude value Mf1' in the second head related transfer function HRTF2 according to some embodiments. Based on aforesaid embodiments about S321~S323, each one of second audio feature values on one audio frequency (e.g., the audio magnitude value Mf1' as shown in FIG. 6) in the second head related transfer function HRTF2 is calculated according to a convolution result based on the first audio feature values on not only with the same frequency, but a least one or more different audio frequencies in the first HRTF. For example, the audio magnitude value Mf1' in the second head related transfer function HRTF2 on one the first frequency f1 is calculated according to the convolution result by the spherical convolutional neural network model SCNN based on the first audio feature values Mf1~Mf9 and Pf1~Pf9 on all of the audio frequencies f1~f9 in the first head related transfer function HRTF1. As shown in FIG. 6, the audio magnitude value Mf1' in the second head related transfer function HRTF2 on one frequency channel considers the first audio feature values Mf1~Mf9 and Pf1~Pf9 form all frequency channels in the first head related transfer function HRTF1, and also consider audio feature values on the intersection nodes in the sampling area AA1 of the first head related transfer function HRTF1.

As shown in FIG. 1 and FIG. 3, step S330 can be executed to output the second head related transfer function HRTF2 from the upsample module 142 to the audio processing unit 144. As shown in FIG. 1, the audio processing unit 144 can process the audio signal AUin and generate the stereo audio signal AUL after localization according to the second head related transfer function HRTF2.

In aforesaid embodiments shown in FIG. 3, the audio processing method 300 includes the step S320 to upsample the HRTF by R times. However, the disclosure is not limited thereto.

Figure 7:
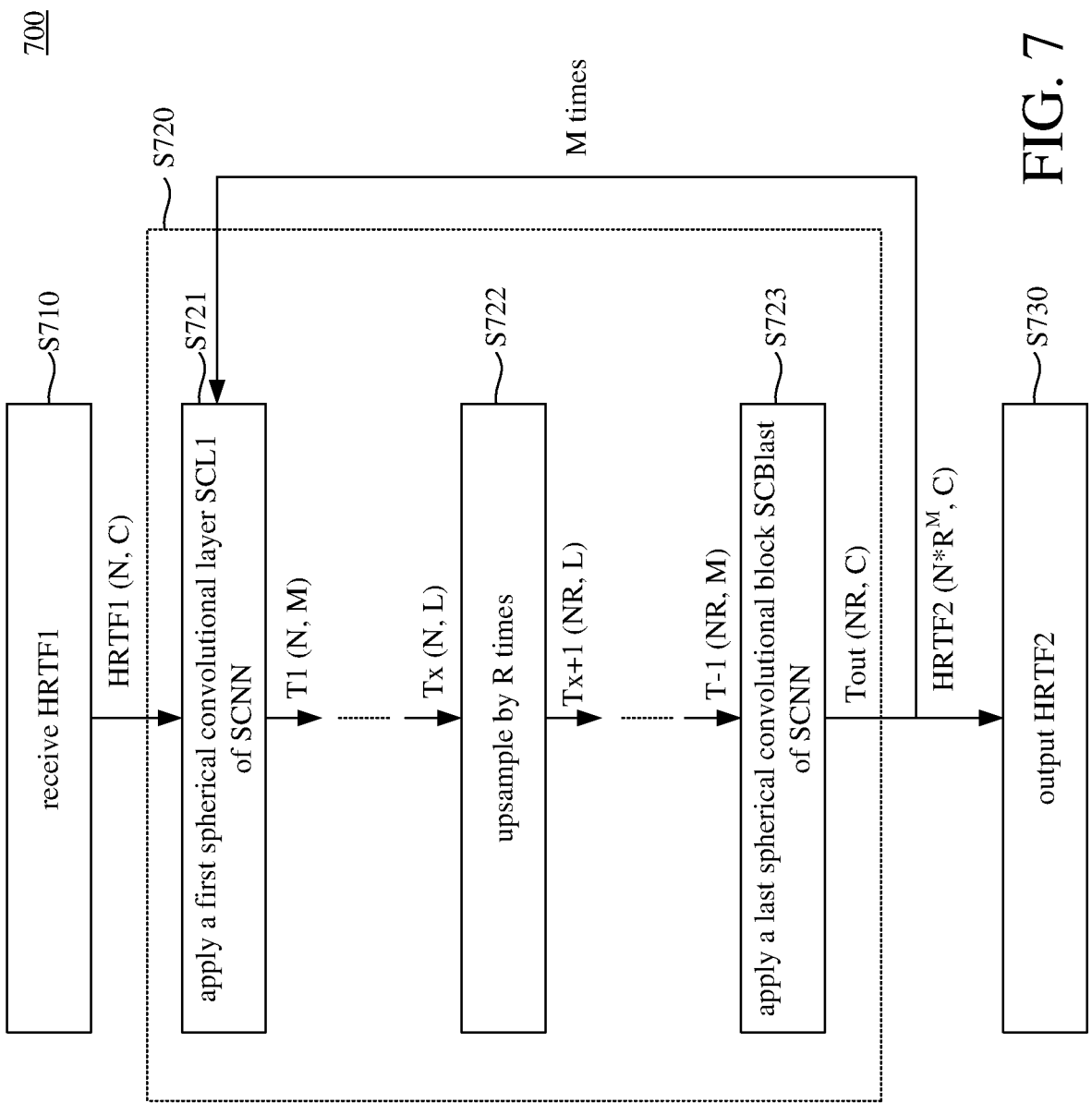
FIG. 7 is a flow chart diagram illustrating an audio processing method according to some embodiments of the disclosure.

In some other embodiments, the audio processing method can be utilized to upsample the HRTF furthermore. Reference is further made to FIG. 7, which is a flow chart diagram illustrating an audio processing method 700 according to some embodiments of the disclosure. In some embodiments, the audio processing method 700 in FIG. 7 is executed by the electronic apparatus 100 in FIG. 1.

The steps S710, S720 (S721~S723) and S730 in the audio processing method 700 in FIG. 7 are similar to the steps S310, S320 (S321~S323) and S330 in the audio processing method 300 in FIG. 3. It is noticed that, the audio processing method 700 can repeat the steps S721-S723 multiple times to furtherly increase the spatial resolution of the second head related transfer function HRTF2. As shown in FIG. 7, the steps S721-S723 can be repeat M cycles to increase the spatial resolution of the second head related transfer function HRTF2 as RAM times of the spatial resolution of the first head related transfer function HRTF1. M is a positive integer larger than 1. For example, the steps S721~S723 can be repeat 3 cycles, such that the spatial resolution of the second head related transfer function HRTF2 as R*R*R (i.e., R^3) times of the spatial resolution of the first head related transfer function HRTF1. Further details about the steps S710, S720 (S721~S723) and S730 are not repeated here again.

In some embodiments, as shown in FIG. 1, the spherical convolutional neural network model SCNN can be trained by a training agent according to training data. In some embodiments, the training agent can be implemented by programmable instruction codes executed by the processor 140 or by an application specific integrated circuit (ASIC). In some other embodiments, the spherical convolutional neural network model SCNN can be trained by an external system (not shown in figures) outside the electronic apparatus 100.

The training data includes plural pairs of training HRTF inputs and training HRTF targets. In practical applications, the training data may include a lot of pairs (e.g., 100 pairs to 10000 pairs) of training HRTF inputs and training HRTF targets. In some embodiments, the training HRTF input can be generated by downsampling the training HRTF target. In other words, multiple nodes on the training HRTF target are merged as one node in the training HRTF input.

The training HRTF input in each training iteration is processed by the upsample module 142 to generate an upsampled result according to the spherical convolutional neural network model SCNN (based on steps S321~S323 or S721~S723 in aforesaid embodiments). Afterward, the training HRTF target and the upsampled result are compared to derive a loss value, and using this value to calculate the updated model parameters for the next iteration. After certain amount of iterations, the model output should be very close to the target.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An audio processing method, comprising:
    receiving a first head related transfer function (HRTF) defining a plurality of first audio feature values distributed at first intersection nodes in a spherical coordinate system over a plurality of audio frequencies, wherein the first intersection nodes are arranged with a first spatial resolution in the spherical coordinate system; and
    upsampling the first HRTF into a second head related transfer function (HRTF) by a spherical convolutional neural network model, wherein the second HRTF defines a plurality of second audio feature values distributed at second intersection nodes in the spherical coordinate system over the audio frequencies, the second intersection nodes in the second HRTF are arranged with a second spatial resolution higher than the first spatial resolution of the first intersection nodes in the first HRTF, each one of second audio feature values on one audio frequency in the second HRTF is calculated according to a convolution result based on the first audio feature values on a group of audio frequencies in the first HRTF, the group of audio frequencies comprises at least an audio frequency different from the one audio frequency.

2. The audio processing method of claim 1, further comprising:
    applying the second HRTF on an audio signal to localize the audio signal to a particular point in space for generating a stereo audio signal; and
    transmitting the stereo audio signal after localization to an audio caster.

3. The audio processing method of claim 1, wherein the first audio feature values in the first HRTF corresponding to each one of the first intersection nodes comprises C audio magnitude/phase values on C different channels, the C different channels correspond to different audio frequencies, and
    the first HRTF defines N first intersection nodes in the spherical coordinate system, the first audio feature values in the first HRTF corresponding to the N first intersection nodes comprises N*C audio magnitude/phase values on the C different channels, N and C are positive integers larger than 1.

4. The audio processing method of claim 3, wherein the step of upsampling the first HRTF into the second HRTF comprises:
    applying a first spherical convolutional block of the spherical convolutional neural network model to the first HRTF to generate a first hidden tensor; and
    extending a number of the audio magnitude/phase values in the first hidden tensor by R times bigger into the second HRTF, the second HRTF defines N*R second intersection nodes in the spherical coordinate system, R is a rational number bigger than 1 and N*R is an integer.

5. The audio processing method of claim 3, wherein the step of upsampling the first HRTF into the second HRTF comprises:
    extending a number of the audio magnitude/phase values in the first HRTF by R times bigger into a second hidden tensor, the second hidden tensor defines N*R second intersection nodes in the spherical coordinate system, R is a rational number bigger than 1 and N*R is an integer; and
    applying a second spherical convolutional block of the spherical convolutional neural network model to the second hidden tensor to generate the second HRTF.

6. The audio processing method of claim 3, wherein the step of upsampling the first HRTF into the second HRTF comprises:
    applying a first spherical convolutional block of the spherical convolutional neural network model to the first HRTF to generate a first hidden tensor;
    extending a number of the audio magnitude/phase values in the first hidden tensor by R times bigger into a second hidden tensor, the second hidden tensor defines N*R second intersection nodes in the spherical coordinate system, R is a rational number bigger than 1 and N*R is an integer; and
    applying a second spherical convolutional block of the spherical convolutional neural network model to the second hidden tensor to generate the second HRTF.

7. The audio processing method of claim 6, wherein the step of extending the first hidden tensor by R times comprises:
    interpolating the audio magnitude/phase values on the N*R second intersection nodes independently for each channel based on spatial positions of the N first intersections nodes and the N*R second intersection nodes.

8. The audio processing method of claim 6, wherein the step of extending the first hidden tensor by R times comprises:
duplicating one audio magnitude/phase value on one channel corresponding to a target one of the first intersection nodes by R times and mapping R duplicated audio magnitude/phase values onto a portion of the second intersection nodes in the spherical coordinate system, wherein the portion of the second intersection nodes are adjacent to the target one of the first intersection nodes in the spherical coordinate system.

9. The audio processing method of claim 6, wherein the first spherical convolutional block or the second spherical convolutional block comprises a spherical convolution neural network layer implemented by a Graph Neural Network (GNN) based spherical convolution network.

10. The audio processing method of claim 9, wherein the first spherical convolutional block or the second spherical convolutional block further comprises a normalization layer, a non-linear activation layer or a padding layer.

11. The audio processing method of claim 1, wherein parameters in the spherical convolutional neural network model are derived from a HRTF database, the HRTF database comprise a plurality of HRTF pairs, each pair of the HRTF pairs comprises a low-resolution HRTF and a high-resolution HRTF, the low-resolution HRTF is generated by down-sampling the high-resolution HRTF.

12. An electronic apparatus, comprising:
a data storage, configured to store a spherical convolutional neural network model; and
a processor, coupled with the data storage, wherein the processor is configured to receive a first head related transfer function (HRTF), the first HRTF defines a plurality of first audio feature values distributed at first intersection nodes in a spherical coordinate system over a plurality of audio frequencies, the first intersection nodes are arranged with a first spatial resolution in the spherical coordinate system, the processor is further configured to upsample the first HRTF into a second head related transfer function (HRTF) by the spherical convolutional neural network model, wherein the second HRTF defines a plurality of second audio feature values distributed at second intersection nodes in the spherical coordinate system over the audio frequencies, the second intersection nodes in the second HRTF are arranged with a second spatial resolution higher than the first spatial resolution of the first intersection nodes in the first HRTF, each one of second audio feature values on one audio frequency in the second HRTF is calculated according to a convolution result based on the first audio feature values on a group of audio frequencies in the first HRTF, the group of audio frequencies comprises at least an audio frequency different from the one audio frequency.

13. The electronic apparatus of claim 12, wherein the processor is configured to apply the second HRTF on an audio signal to localize the audio signal to a particular point in space for generating a stereo audio signal, and to transmit the stereo audio signal after localization to an audio caster.

14. The electronic apparatus of claim 12, wherein the first audio feature values in the first HRTF corresponding to each one of the first intersection nodes comprises C audio magnitude/phase values on C different channels, the C different channels correspond to different audio frequencies, and
the first HRTF defines N first intersection nodes in the spherical coordinate system, the first audio feature values in the first HRTF corresponding to the N first intersection nodes comprises N*C audio magnitude/phase values on the C different channels, N and C are positive integers larger than 1.

15. The electronic apparatus of claim 14, wherein the processor is configured to upsample the first HRTF into the second HRTF by:
applying a first spherical convolutional block of the spherical convolutional neural network model to the first HRTF to generate a first hidden tensor; and
extending a number of the audio magnitude/phase values in the first hidden tensor by R times bigger into the second HRTF, the second HRTF defines N*R second intersection nodes in the spherical coordinate system, R is a rational number bigger than 1 and N*R is an integer.

16. The electronic apparatus of claim 14, wherein the processor is configured to upsample the first HRTF into the second HRTF by:
extending a number of the audio magnitude/phase values in the first HRTF by R times bigger into a second hidden tensor, the second hidden tensor defines N*R second intersection nodes in the spherical coordinate system, R is a rational number bigger than 1 and N*R is an integer; and
applying a second spherical convolutional block of the spherical convolutional neural network model to the second hidden tensor to generate the second HRTF.

17. The electronic apparatus of claim 14, wherein the processor is configured to upsample the first HRTF into the second HRTF by:
applying a first spherical convolutional block of the spherical convolutional neural network model to the first HRTF to generate a first hidden tensor;
extending a number of the audio magnitude/phase values in the first hidden tensor by R times bigger into a second hidden tensor, the second hidden tensor defines N*R second intersection nodes in the spherical coordinate system, R is a rational number bigger than 1 and N*R is an integer; and
applying a second spherical convolutional block of the spherical convolutional neural network model to the second hidden tensor to generate the second HRTF.

18. The electronic apparatus of claim 17, wherein the processor is configured to extend the first hidden tensor by R times into the second hidden tensor by:
interpolating the audio magnitude/phase values on the N*R second intersection nodes independently for each channel based on spatial positions of the N first intersections nodes and the N*R second intersection nodes.

19. The electronic apparatus of claim 17, wherein the processor is configured to extend the first hidden tensor by R times into the second hidden tensor by:
duplicating one audio magnitude/phase value on one channel corresponding to a target one of the first intersection nodes by R times and mapping R duplicated audio magnitude/phase values onto a portion of the second intersection nodes in the spherical coordinate system, wherein the portion of the second intersection nodes are adjacent to the target one of the first intersection nodes in the spherical coordinate system.

20. The electronic apparatus of claim 17, wherein the first spherical convolutional block or the second spherical convolutional block comprises a spherical convolution neural network layer implemented by a Graph Neural Network (GNN) based spherical convolution network, the first spherical convolutional block or the second spherical covolutional block further comprises a normalization layer, a non-linear activation layer or a padding layer.

* * * * *